United States Patent [19]

Akitoshi et al.

[11] 4,385,035

[45] May 24, 1983

[54] APPARATUS FOR CONTINUOUSLY STERILIZING FLAT FLEXIBLE PACKAGES

[75] Inventors: Hiroshi Akitoshi, Zushi; Yoshimi Terajima, Ebina; Kazumi Hirota, Tokyo, all of Japan

[73] Assignee: Toyo Seikan Kaisha Ltd., Tokyo, Japan

[21] Appl. No.: 173,498

[22] Filed: Jul. 29, 1980

Related U.S. Application Data

[62] Division of Ser. No. 966,048, Dec. 4, 1978, abandoned.

[51] Int. Cl.³ .......................... A61L 2/04; A61L 2/06; A23L 3/04
[52] U.S. Cl. ....................................... 422/297; 99/361; 99/362; 99/366; 99/368; 99/371; 99/483; 422/25; 422/302; 422/304; 426/407; 426/412
[58] Field of Search ................. 426/412, 407; 422/297, 422/302, 304, 26, 25; 99/361, 362, 366, 367, 368, 371, 483

[56] References Cited

U.S. PATENT DOCUMENTS

| | | | |
|---|---|---|---|
| 713,952 | 11/1902 | Busch et al. | 422/304 X |
| 1,408,429 | 3/1922 | Anderson et al. | 99/366 |
| 1,408,430 | 3/1922 | Anderson | 99/366 |
| 2,268,563 | 1/1942 | Ball | 99/483 X |
| 2,385,828 | 10/1945 | Mehline et al. | 99/361 |
| 3,418,918 | 12/1968 | Beauvais et al. | 99/362 |
| 3,464,835 | 9/1969 | Castro | 426/412 X |
| 3,481,691 | 12/1969 | Trainham | 422/297 X |
| 3,495,523 | 2/1970 | Mencacci | 99/366 |
| 3,622,356 | 11/1971 | Long | 426/412 |
| 3,812,270 | 5/1974 | Hartz | 426/412 X |
| 3,824,917 | 7/1974 | Kawahara et al. | 422/302 X |
| 3,927,976 | 12/1975 | Reimers et al. | 426/407 X |
| 3,971,629 | 7/1976 | Buix et al. | 422/302 |
| 3,972,679 | 8/1976 | Ruig | 426/412 X |
| 3,986,832 | 10/1976 | Smorenburg | 426/412 X |

FOREIGN PATENT DOCUMENTS

| | | | |
|---|---|---|---|
| 567862 | 12/1958 | Canada | 426/407 |
| 1957060 | 5/1971 | Fed. Rep. of Germany | 426/412 |
| 2452818 | 5/1976 | Fed. Rep. of Germany | 422/26 |
| 2559264 | 7/1977 | Fed. Rep. of Germany | 422/26 |
| 49-34822 | 9/1974 | Japan | 426/412 |

Primary Examiner—Barry S. Richman
Attorney, Agent, or Firm—Wenderoth, Lind & Ponack

[57] ABSTRACT

The apparatus comprises a sealed chamber including a sterilizing section, a cooling section and a conveyor including carrier receivers and circulated through the sterilizing and cooling sections. The flat flexible packages containing substances to be sterilized are contained in rotatable carriers. With one side of the sealed chamber is provided a sealing means through which the carriers are charged and discharged into and out of the sealed chamber.

7 Claims, 10 Drawing Figures

APPARATUS FOR CONTINUOUSLY STERILIZING FLAT FLEXIBLE PACKAGES

This application is a division of application Ser. No. 966,048 filed Dec. 4, 1978, now abandoned.

BACKGROUND OF THE INVENTION

This invention relates to a method and apparatus for continuously sterilizing substances contained in flat and flexible packages at a sterilizing temperature of higher than 100° C. and under a pressure higher than atmospheric pressure, said packages being packed with such a substance as a foodstuff to be sterilized and then sealed, and the innermost layers or portions of the flexible packages being made of heat sealable film.

Various types of continuous sterilization apparatuses have been used for sterilizing cans but batch-type of sterilization has mainly been used in the past for sterilizing flexible packages. The continuous sterilizers utilized to sterilize cans seem to be particularly suitable for mass production and suitable for a larger output of the products of the same type as in the manufacture of canned foodstuff. The total output of flexible packages such as retortable pouches has relatively increased, but it has been rarely the case that a large number of such packages are treated in one factory, so that the demand for continuous sterilizers has been, until recently, small.

However, with the recent tendency toward mass production of retortable pouches in one factory continuous sterilizers have been increasingly in demand.

Another reason for adopting continuous sterilizers is based on the consideration of saving energy and labor. With the batch-type method of sterilization, since successive sterilization cycles are performed independently, the amounts of the heating medium such as steam, and cooling water required for the sterilization process seem to be larger than those for a continuous method. Furthermore, in the batch-type method, considerable labor is required to load and unload the articles to be sterilized. Accordingly, development of an efficient apparatus capable of continuously sterilizing retortable pouches has long been desired.

A third reason for adopting continuous sterilization is based on considerations of food engineering. Usually, cans have been sterilized at a temperature of about 120° C., but it has been proved not only theoretically but also experimentally that some foodstuffs maintain better quality when sterilized in a shorter time at a higher temperature than at a lower temperature for a longer time. Various factors that affect the quality of foodstuffs, such as flavour, fragrance, color and nutritive value. (Vitamins) are chemically unstable and the rate of destruction of these factors caused by being subjected to heat increases 2 to 3 times for each 10° C. rise of temperature as does a chemical reaction. On the other hand, the normal rate of destruction of bacteria (saprogenuous bacilluses) usually increases 10 to 20 times for each 10° C. rise of temperature. From these facts, it can be seen that when food is sterilized at a high temperature the bacteria like saprogenuous bacilluses will be destroyed in a short time but considerable amounts of vitamins will survive.

With regard to heat penetration, since cans are generally cylindrical, it requires a relatively long time before the center of the can reaches the pre-determined temperature during which local burning tends to occur. For this reason, the can must be kept in violent agitation particularly during sterilization. However, a flexible package is flat and its thickness is not so large. These characterics result in a rapid heat transfer, so that the temperature differential between the central and peripheral portions is smaller than in a can. Accordingly, flat and flexible packages are suitable for high-temperature short-time sterilization.

In the case of high-temperature short-time sterilization, the temperature of the contents needs to be rapidly increased so sterilization of canned food requires severe agitation for the purpose of averaging the temperatures at the central and peripheral portions since the temperature differential therebetween is large as pointed out above. However, in the case of such flexible packages as retortable pouches the packages would be damaged when a severe agitation is used because they do not have sufficient strength as compared with cans and in certain cases the sterilized packages may be damaged and there is a risk of spoilage. However, as above described, flexible packages are flat and the temperature differential between the central and peripheral portions is small, so that the flexible packages can be sterilized at a high temperature without applying agitation such as is used in the case of cans.

In high-temperature short-time sterilization, because a high rate of heat penetration into a food contained in the pouch is needed, it is desirable that the temperature of the sterilizing atmosphere should reach a predetermined high temperature as fast as possible (come-up time), so that with a conventional batch-type method requiring a considerably long come-up time, the high-temperature short-time sterilization can not be achieved. For this reason, it is desirable to provide a sterilizing apparatus capable of reducing the come-up and down time close to zero, that is a continuously sterilizing apparatus.

Among various types of continuous sterilizers which can be used for sterilizing cans, those suitable for the sterilization of flexible packages are a hydrostatic-type sterilization apparatus and a sterilization apparatus utilizing a special valve. In the former type, in order to maintain a predetermined pressure in the sterilizing chamber there is provided a water column communicating with the sterilizing chamber at the bottom so as to cause the hydrostatic pressure head in the column to balance with the pressure in the sterilizing chamber. Accordingly, a high water column must be used in order to maintain a high pressure in the sterilizing chamber, thus requiring the installing of a tall column. When steam is used as the heating medium, the pressure is about 1 kg/cm$^2$ at a temperature of 120° C., about 2.2 kg/cm$^2$ at 135° C. and about 3.9 kg/cm$^2$ at 150° C., so that a hydrostatic-type sterilization apparatus is required to use a water column having a height of about 10 m for 120° C., about 22 m for 135° C. and 39 m for 150° C. In this manner, high-temperature short-time sterilization using a hydrostatic-type sterilizer is actually limited by the construction of the apparatus. At present, the maximum sterilization temperature available in a hydrostatic-type sterilizer is said to be about 128° C.

In sterilization apparatus utilizing a special valve as a sealing means, since a chain conveyor for conveying such containers as cans is passed through the valve, it is impossible to prevent leakage of cooling water through the small gap through which the chain conveyor passes. Accordingly, pumping means are provided for replacing the leaked cooling water, and in certain cases a pump having a substantial capacity is needed. The highest sterilization temperature of this type of apparatus is said to be about 143° C.

As described above, these continuous sterilizers are designed for mass production, but in some countries where a large number of pouches are not heat-processed in one factory, it is desirable to provide inexpensive continuous sterilizers having a relatively small size and capacity.

However, in order to save energy and labor a fully automated continuous sterilization system must be used in which not only the sterilization apparatus per se but also various equipment installed before and after can be suitably connected to operate automatically. Otherwise, the advantage of a fully automatic line can not be realized. As compared with such rigid containers as cans and bottles, the flexible packages are flexible and have lower mechanical strength so that there are such problems as wrinkling, scratching, folding, warping and welding seam damage. Thus, there are many problems involved in establishment of a fully automatic processing system.

SUMMARY OF THE INVENTION

Accordingly, it is an object of this invention to provide a continuous sterilization method capable of automatically sterilizing flexible packages at a high temperature.

Another object of this invention is to provide a novel continuous sterilization apparatus capable of continuously sterilizing flexible packages such as retortable pouches at high temperatures and reducing the amount of leaking cooling water and enabling sealing at higher pressures.

A further object of this invention is to provide a novel continuous sterilization apparatus for flexible packages which operates without damaging the packages, which can efficiently transmit heat to the packages and can readily introduce and discharge the packages into and from the sterilizing chamber.

Still further object of this invention is to provide a continuous sterilization apparatus wherein the operation of a sealing means and the operations of article admitting and discharge mechanisms are synchroniized.

Another object of this invention is to provide an improved rotatable carrier capable of containing a plurality of flat flexible packages and carry them in a horizontal position during heating and cooling.

According to one aspect of this invention, there is provided a method of continuously sterilizing flat packages comprising the steps of positioning sealed flexible packages each packed with substances to be sterilized in trays, stacking trays one above the other, accommodating the stacked trays in a rotatable carrier, admitting the carrier into a continuous sterilization apparatus, sterilizing the packages in the carrier while the carrier is conveyed through the sterilization apparatus and while the packages are maintained in a horizontal position, cooling the sterilized packages, discharging the carrier from the sterilization apparatus, removing the stacked trays from the carrier, separating the stacked trays and taking the sterilized packages out of the trays and repeating the steps in the order mentioned.

According to another aspect of this invention, there is provided a carrier for flexible packages comprising a rectangular inner container partitioned by partition means into a plurality of compartments each accommodating flat flexible packages, the inner container being provided with vent holes and having a height sufficient to form a space above the flexible packages accommodated in respective compartments, an outer container having a volume sufficient to acccommodate a stack of a plurality of inner containers, the outer container being provided with vent holes and open at its upper side, a clamping plate biased by spring means for clamping the stack, an operating rod for opening said clamping plate against the force of the spring means, and wheels rotatably mounted on both sides of the outer container.

According to still another aspect of this invention, there is provided a continuous sterilization apparatus comprising a sealed chamber including a sterilizing section filled with heating medium and a cooling section filled with cooling water, the heating section and the cooling section being in contact with each other through a limited contact region, a conveyor provided with a plurality of carrier receivers for receiving carriers to be sterilized, means for moving the conveyor for conveying the carrier receivers successively through the sterilizing section, the cooling section and the contact region, a sealing means blocking direct communication between the inside and outside of the sealed chamber, an admission mechanism for supplying carriers to be sterilized into the carrier receivers through the sealing means, a discharge mechanism for discharging sterilized carriers to the outside of the sealed chamber from the carrier receivers via the sealing means, supporting means arranged between the carrier receivers and the sealing means for holding the carriers, revolving levers for moving the carriers on the supporting means between the carrier receivers and the sealing means, and means for operating the revolving levers in synchronism with the rotation of the sealing means.

Each carrier receiver comprises a semi-circular member for holding afore-mentioned rotatable carrier containing a plurality of flat flexible packages.

In a preferred embodiment, a water tank is provided on the outside of the sealing means and a conveyor is installed in the water tank for supplying and receiving carriers to and from the sealing means. In this manner the carriers to be sterilized can also be preheated in the water tank.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
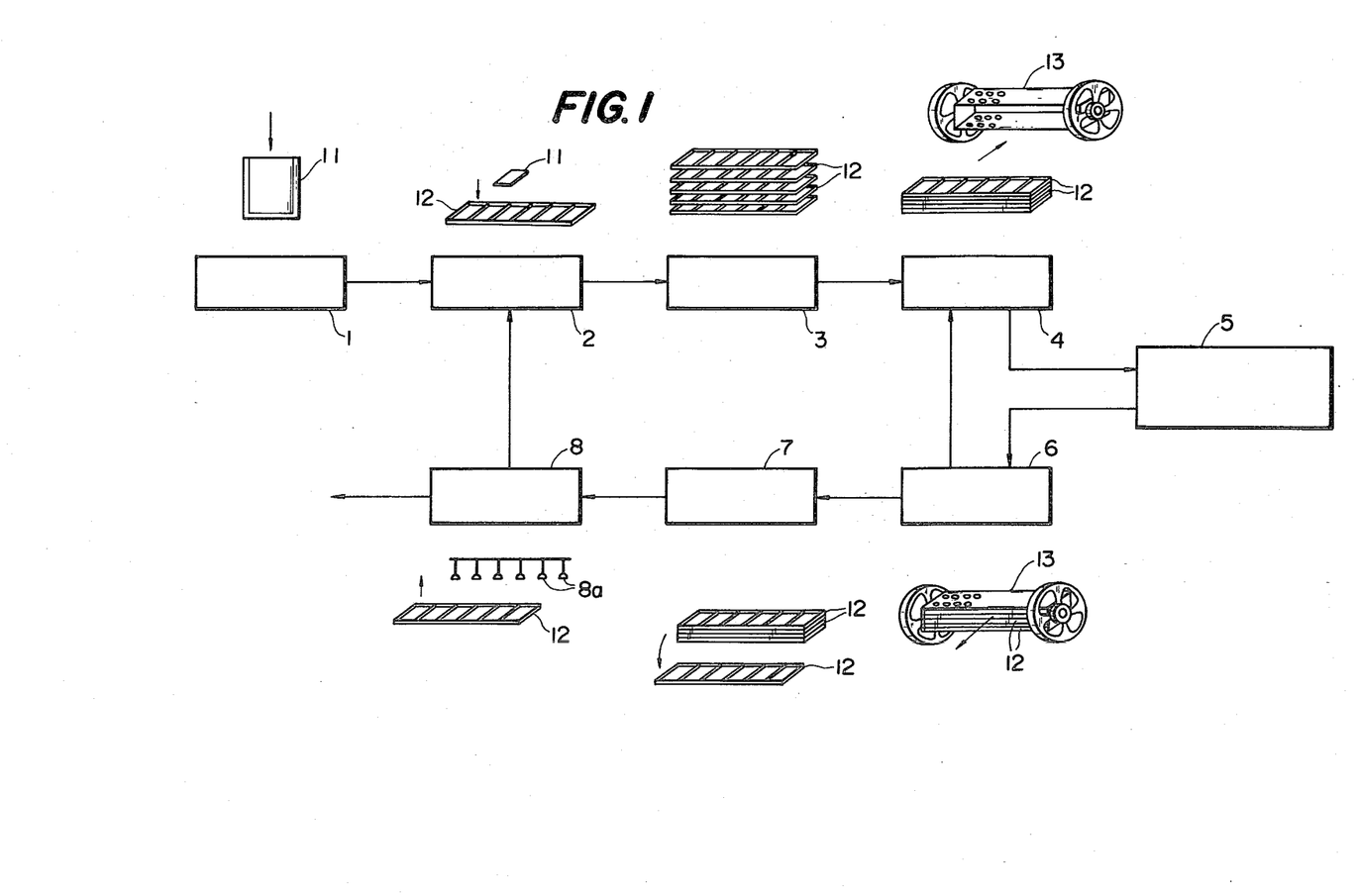
FIG. 1 is a block diagram for explaining the method of sterilization of this invention.

Referring now to the block diagram shown in FIG. 1, containers constituted by flexible packages 11 are intermittently conveyed to an automatic filling and sealing machine 1 where contents such as a foodstuff are sequentially loaded in the containers and the openings thereof are heat sealed to form flexible packages 11. The packages are then positioned in trays 12 at the package loader 2 and the trays 12 containing the packages are discharged from the package loader 2 at a predetermined position thereof. The trays 12 are then stacked one upon the other by a tray stacker 3. The stack of the trays 12 is loaded in a carrier 13 by a tray loader 4. The details of the carrier 13 will be described later. The carriers are then admitted into a continuous sterilization apparatus 5 through a sealing means as will be described later and sterilized continuously at a temperature of higher than 100° C. and under a pressure of higher than the atmospheric pressure. Then, the carriers are conveyed to a cooling section. After being cooled by water the carriers are discharged from the sterilization apparatus 5 through the sealing means described above.

The carrier discharged from the sterilization apparatus 5 is conveyed to a tray unloader where the trays are removed from the carrier 13 by a fluid pressure cylinder mechanism, for example, and the empty carrier 13 is returned to the tray loader 4 by a conveyor or the like.

Stacked trays 12 discharged from the carrier are removed one after one by a tray unstacker 7 and transferred to the succeeding steps. A package unloader 8 provided with suction cups 8a removes sterilized and cooled packages 11 from the tray 12 to send them to a drier, not shown, and empty trays are returned to the package loader 2.

In the system described above, the package loader 2, the tray stacker 3 and the tray loader 4 are positioned along one line, while the tray unloader 6, the tray unstacker 7 and the package unloader 8 are disposed along another line and by arranging the package loader 2 and package unloader 8 adjacent each other and by arranging the tray loader 4 and tray unloader 6 adjacent each other it is not only possible to minimize the space occupied by the continuous sterilization system but also convenient to return the carriers and trays.

Figure 2:
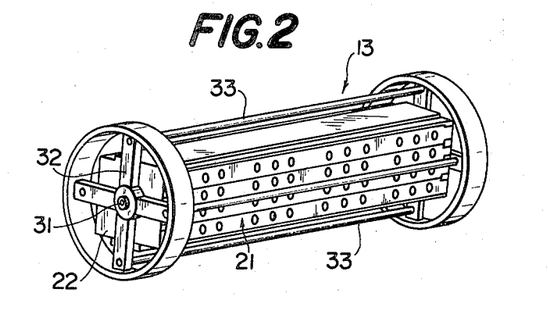
FIG. 2 is a perspective view showing a carrier for carrying flexible packages utilized in this invention.
Figure 3:
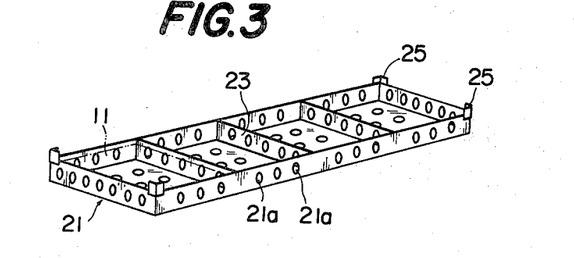
FIG. 3 is a perspective view showing a container utilized in the carrier.
Figure 4:
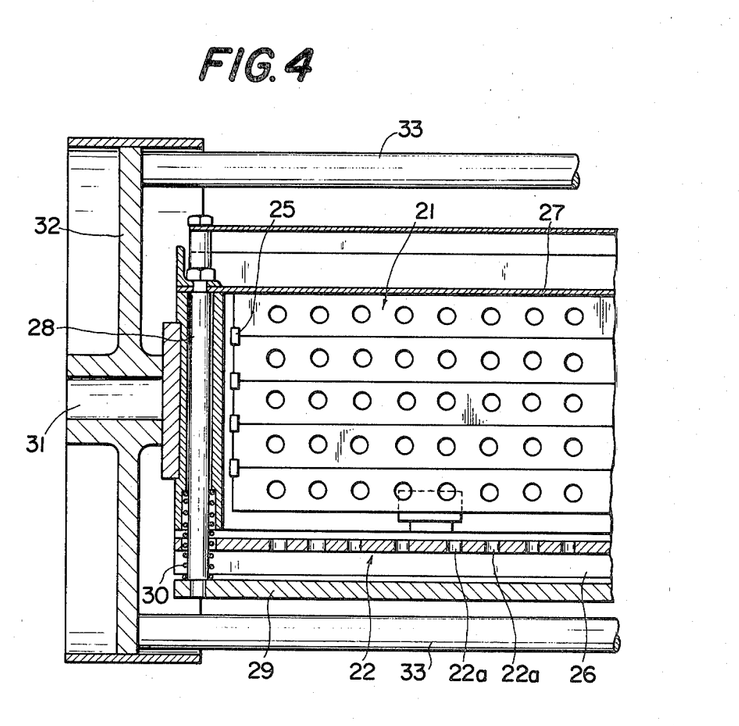
FIG. 4 is an enlarged longitudinal sectional view of one end of the carrier.
Figure 5:
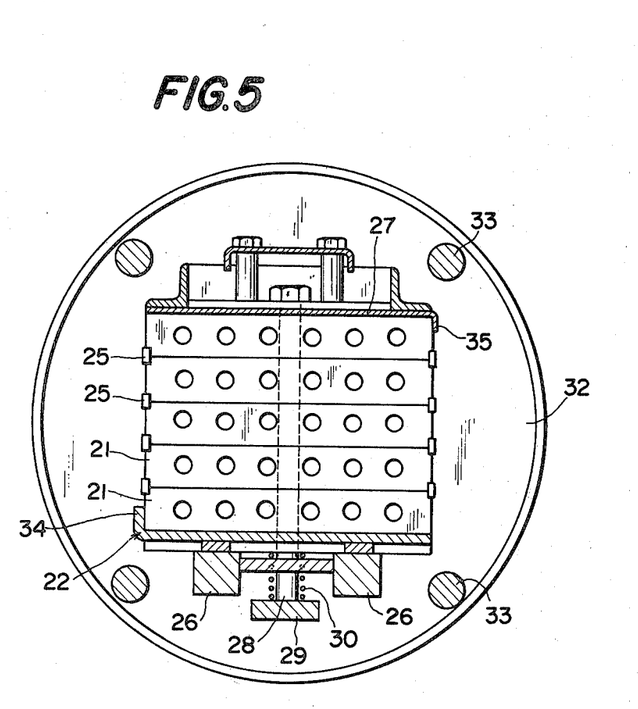
FIG. 5 is a cross-sectional view of the carrier.

As shown in FIG. 2, the carrier 13 for the flexible packages comprises trays that are inner containers 21 and an outer container 22. As shown in FIG. 3, each inner container 21 takes the form of a rectangular tray partitioned by partition walls 23 into a plurality of compartments for accommodating a flat flexible package in each compartment. The tray has a height sufficient to form a space above the packages 11 contained therein and is provided with a plurality of vent holes 21a through its side walls, partition walls and bottom wall, and angle shaped stack guides 25 at the four corners. As shown in FIGS. 2, 4 and 5, the outer container 22 is provided with an opening at least in the front side for receiving the inner container 21 whereas the upper surface of the outer container is open. The outer container has a volume sufficient to accommodate a stack of several inner containers 21 and is provided with a plurality of vent openings 22a through its bottom plate. A weight 26 is fitted under the bottom wall. A clamping plate 27 for clamping the inner containers is fitted on the upper portion of the outer container 22. To the opposite ends of the clamping plate 27 are secured two guide shafts 28 which slidably extend through the side walls of the outer container 22 to the portion beneath the bottom plate of the outer container 22 where the lower ends of the guide shafts are secured to an operating lever 29 which is biased downwardly by coil springs 30 surrounding the lower portions of the guide shafts 28. Shafts 31 are secured to the side walls of the outer container 22 for supporting wheels 32 which are interconnected by several tie rods 33. As shown in FIG. 5, stop member 34 is provided for the rear side of the bottom plate of the outer container 22 while a stop member 35 is provided on the front side of the clamping plate 27.

When the operating lever 29 is pushed upwardly against the force of springs 30, the clamping plate 27 is raised through guide shaft 28 thereby permitting insertion of a stack of inner containers 21 (each containing a number of flexible packages). Upon release of the operating lever 29 the clamping plate 27 is urged against the stack by the restoring force of the springs thus forcing the stack against the bottom plate of the outer container 22. The flexible packages are conveyed under these conditions for sterilization and cooling.

Figure 6:
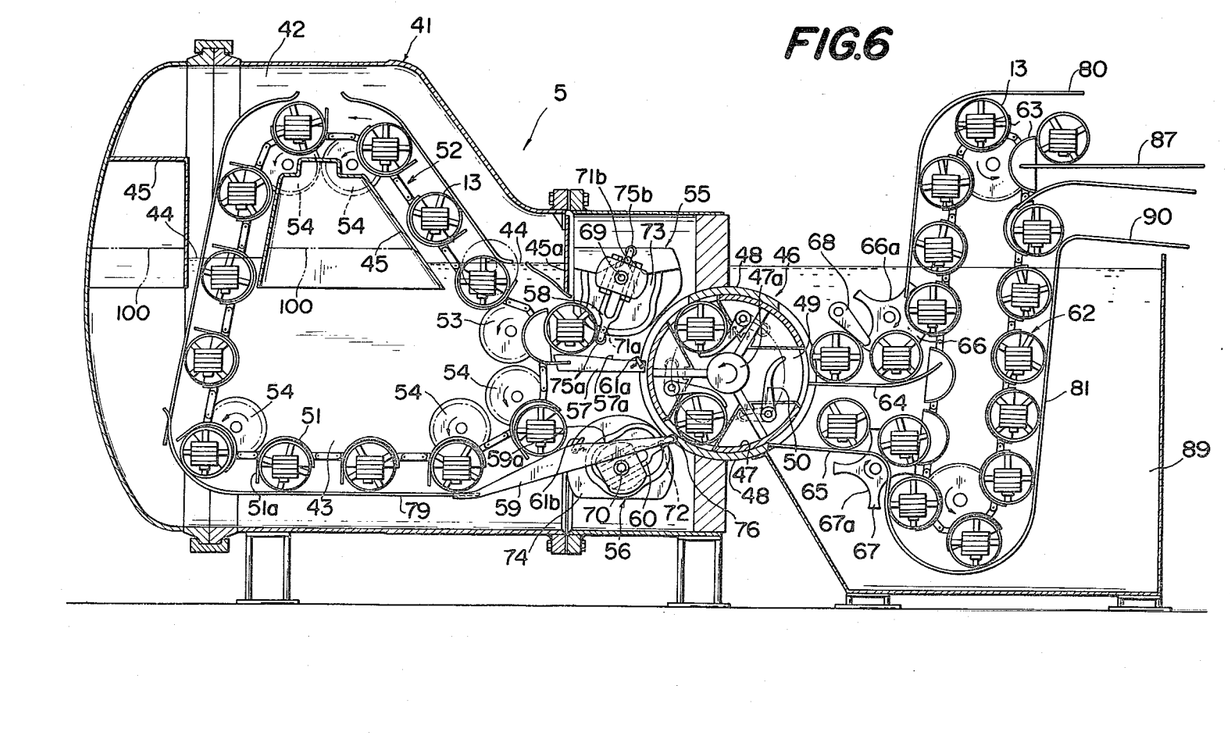
FIG. 6 is a side view, partly in section, showing one embodiment of the continuous sterilization apparatus of this invention.
Figure 7:
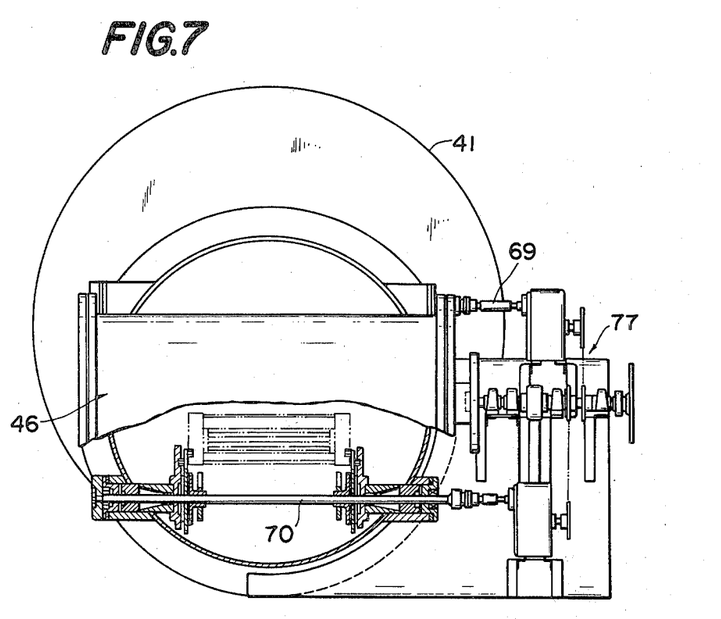
FIG. 7 is a front view, partly broken away, showing the operating shaft utilized in this invention.

As shown in FIGS. 6 and 7, the continuous sterilization apparatus 5 comprises a sealed chamber 41 having its interior divided by a thermal insulator 45 into a sterilizing section 42 and a cooling section 43, the former being filled with heating medium, for example steam, whereas the latter is filled with cooling water to a level 44. A vertical partition wall 45a is provided for the upper portion of the righthand portion of the casing 41 and to the right of this partition wall is provided a sealing means 46 which prevents direct communication between the inside and outside of the sealed chamber. The height of the portion of the chamber between the partition wall 45a and the sealing means 46 is smaller than that of the other portion. The thermal insulator 45 is formed with a depending portion so as to form an air space between the lower surface of the insulator 45 and the level 100 of the cooling water thereby minimizing heat transfer from the heating medium to the cooling water. Pressurized air can be supplied to the air space. The position of the level 100 of the cooling water depends on the amount and pressure of the air contained in the air space.

The sealing means 46 comprises a rotor 47 having a horizontal shaft 47a and rotated in the counterclockwise direction in the casing 48. There are small gaps of about 0.05 to 0.25 mm between the periphery of the rotor and the inner surfaces of the casing. Accordingly, when compared with contact-type sealing members, this construction is more advantageous from the standpoint of wear of the sealing member and driving force required to drive the rotor. The results of experiments show that the leakage of the cooling water in the sterilizing chamber through such a narrow gap is very small bacause of the viscosity of the cooling water, and thus it is possible to maintain the atmosphere and the water level in the sterilizing chamber in a stable condition by returning the leakage or supplying fresh water to the cooling section of the chamber. The rotor 47 is provided with three carrier receiving pockets 49 which are equally spaced in the circumferential direction. Each pocket 49 has a lever 50 which is rotated to push out the carrier received therein as will be described later.

A chain conveyor 52 is installed in the chamber 41 for successively conveying carrier receivers 51 containing the carriers 13 through the sterilizing section 42 and the cooling section 43 which are constructed such that the heating medium and the cooling water contact with each other at two limited contact regions 44 (the level of the cooling water). The chain conveyor 52 comprises a pair of endless chains 52 between which a plurality of carrier receivers 51 are positioned at a predetermined spacing. Each carrier receiver 51 has a substantially semicircular cross-sectional configuration. The conveyor passes over a plurality of wheels 54 and a drive-wheel 53 and travels along a trapezoidal pass.

As shown in FIG. 6, an admission mechanism 55 and a discharge mechanism 56 are provided. The admission mechanism 55 includes a substantially horizontal supporting member 57 for supporting carriers and a revolving lever 58 mounted thereabove, whereas the discharge mechanism 56 comprises an inclined supporting member 59, and a revolving lever 60. The supporting members 57 and 59 are secured to the inside of the chamber between the conveyor 52 and the rotor 47 of the sealing means 46 and are provided with recesses 57a and 59a for preventing the carrier from rolling in the direction of the rotor and of the chain conveyor, respectively. To more positively prevent such rolling of the carrier, stops 61a and 61b may be provided. On the outside of the sealing means 46 is disposed a carrier-charge and discharge conveyor 62 having a plurality of equally spaced semi-circular carrier receivers 63. Upper and lower guide plates 64 and 65 extend between the conveyor 62 and the sealing means 46 and turrets 66 and 67 for conveying the carrier are pivotally mounted above and below the guide plates 64 and 65 respectively. A water tank 89 able to preheat the carrier is disposed to the right of the chamber 41 and a portion of the carrier-charge and discharge conveyor 62, guide plates 64 and 65, turrets 66 and 67 and revolving lever 68 are immersed in the water in the water tank 89. The level of the water is the same as level 44.

Figure 8:
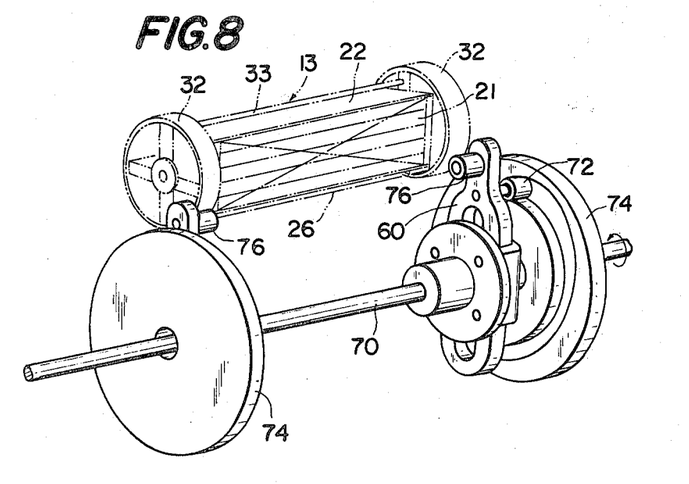
FIG. 8 is a perspective view showing the discharge mechanism and the carrier.

As shown in FIGS. 6 and 8, the revolving levers 58 and 60 are mounted on operating shafts 69 and 70 to rotate therewith and to be slidable in the radial direction, and the cam-followers 71a, 71b and 72 secured to the revolving levers 58 and 60 engage with cams 73 and 74 respectively secured to the side wall of the chamber 41. Supporting rollers 75a and 75b are secured on the opposite ends of the upper revolving lever 58 to cooperate with the cam 73 so as to move the lever 58 in the radial direction once at each one half revolution of the shaft 69. A supporting roller 76 is mounted on one end of the revolving lever 60 to cooperate with cam 74 so as to move lever 60 in the radial direction once for each revolution of shaft 70.

Figure 9:
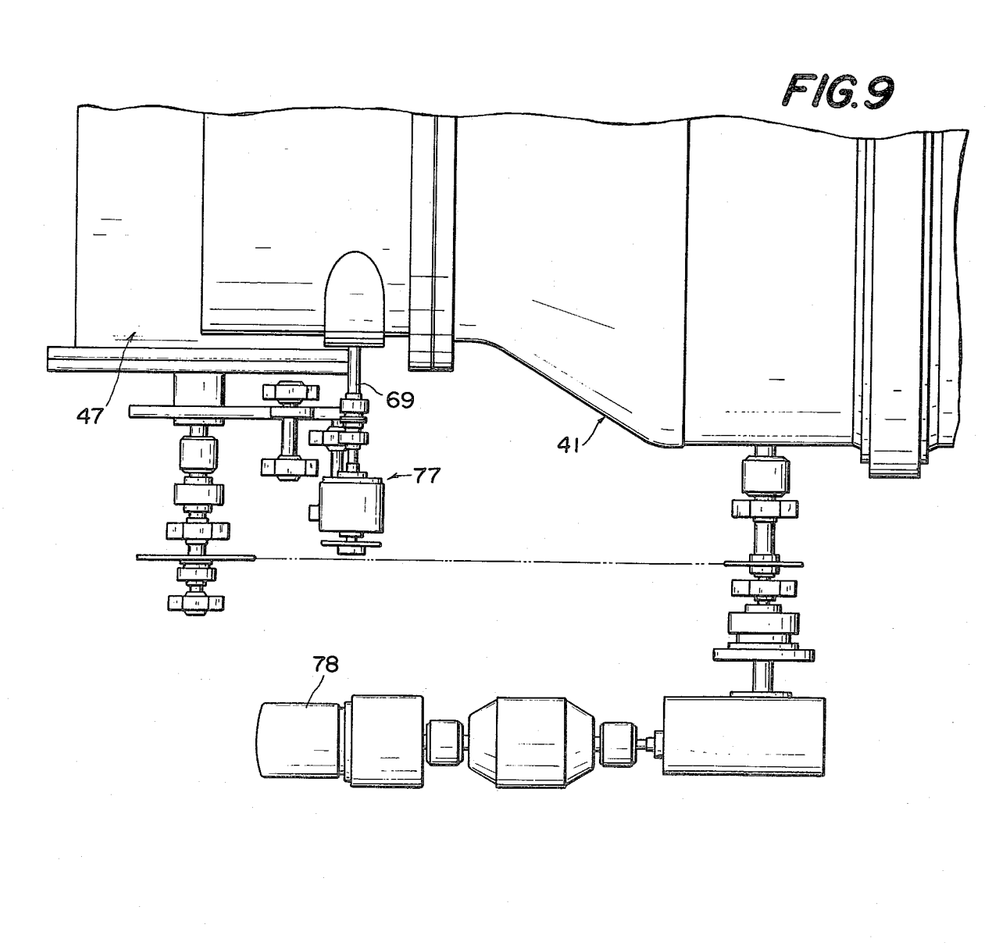
FIG. 9 is a plan view showing a power transmission mechanism.
Figure 10:
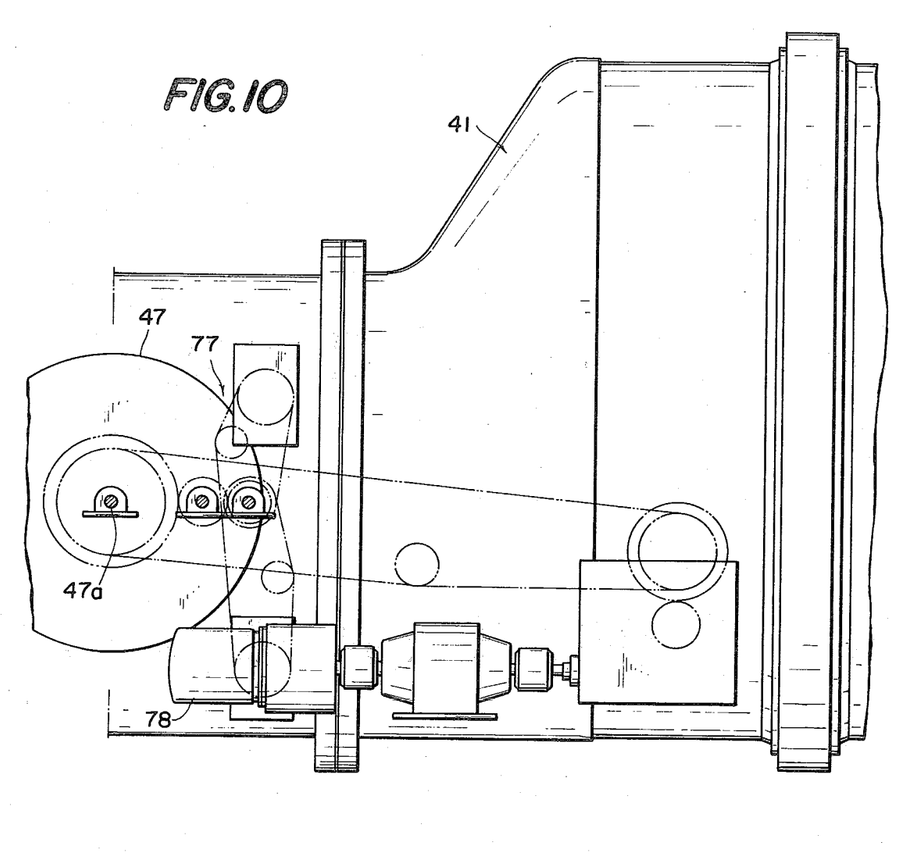
FIG. 10 is a side view of the power transmission mechanism.

As shown in FIGS. 7, 9 and 10, the operating shafts 69 and 70 and the shaft 47a of the rotor 47 are driven by an electric motor 78 through a transmission mechanism 77. Although not shown in the drawing, the turrets 66 and 67, and the revolving lever 68 are driven synchronously with the shaft 47a of the rotor 47 and the chain conveyor 52.

As shown in FIG. 6, there are also provided a guide 79 for the chain conveyor 52, guides 80 and 81 for the carrier-charge and discharge conveyor 62, a supply chute 87, and a discharge chute 90.

The method for sterilizing flexible packages with the continuous sterilization apparatus described above by using carriers 13 shown in FIG. 3 is as follows. At first the flexible packages are positioned horizontally in the trays 21, and a stack of the trays is positioned in a carrier. The carriers 13 are successively supplied to carrier-receivers 63 of the carrier-charge and discharge conveyor 62 through supply chute 87, and the carriers are conveyed toward one side of the sealing means 46. The carriers 13 are then successively received in the pockets 66a of the turrets 66 and are supplied onto the upper guide plate 64. Then, by the rotation of the revolving arm 68, the carriers 13 are sequentially forced into the pockets 49 of the rotor 47 of the sealing means 46. As the rotor rotates in the counterclockwise direction as shown in FIG. 6 and one of the pockets 49 reaches the supporting member 57 of the admitting mechanism 55, the lever 50 is rotated to push the carrier received in that pocket into the recess 57a of the supporting member 57. Immediately thereafter, the revolving lever 58 is rotated by the operating shaft 69 which rotates in the clockwise direction to project the lever 58 downwardly thus pushing the carrier 13 to the left as viewed in FIG. 6. Consequently, the carrier 13 on the supporting member 57 is positioned in one carrier receiver 51 of the chain conveyor 52 circulating in the counterclockwise direction. The carrier positioned in the carrier receiver is conveyed through the cooling water into the sterilizing section 42 via contact region 44 by the chain conveyor 52. In the sterilizing section 42, the flexible packages in the carrier are sterilized by the heating medium. Then, the carrier is conveyed to the cooling section 43 via contact region 44 where it is cooled by the cooling water. The cooled carrier is then put onto the inclined supporting member 59 of the discharge mechanism 56 when the opening of the carrier receiver 51 is directed downwardly. The end part 51a of the carrier receiver 51 pushes the carrier into the recess 59a of the supporting member 59. When the revolving lever 60 rotated by the operating shaft 70 which rotates in the clockwise direction is projected upwardly, the lever 60 rotates in the right direction as viewed in FIG. 6 to push the cooled carrier into the pocket 49 from which the lever 50 has already been withdrawn after it pushes the carrier to be sterilized into the recess 57a of the supporting member 57. This carrier is discharged to the outside of the chamber 41 by the rotation of the rotor 47 and when pocket 49 reaches a position above the lower guide plate 65, the lever 50 is rotated to push the carrier out of the pocket 49 onto the lower guide plate 65. The carrier is received in the pocket 67a of the turret 67 and then loaded in a carrier receiver 63 of the carrier-charge and discharge conveyor 62. On the side opposite the sealing means 46 the carrier is discharged from the carrier receiver 63 and sent to the tray-unloader through discharge chute 90.

Although in the foregoing description, the desired sterilization and cooling operations were described in connection with a single carrier it will be clear that a plurality of carriers are successively treated in the same manner.

During the above described operations, the levers 50 of the rotor 47 of the sealing means 46 are rotated to project into the pockets for pushing the carriers before sterilization and after cooling out of the pockets, and then the levers 50 are rapidly withdrawn. The rotor 47 of the sealing means 46 is immersed in water on the inside and outside of the casing thereby efficiently and safely preventing the leakage of the cooling water. The trays in the carrier are maintained in a horizontal position during transferring by the weight provided on the outer container 22.

The revolving levers 58 and 60 of the admitting mechanism 55 and the discharge mechanism 56 are guided by cams 73 and 74 to transfer the carriers 13. These levers are projected radially to move the carrier only in regions in which the carrier is to be moved, whereas in the other regions, the levers are retracted so as not to contact the next carrier. Stop members 61a and 61b prevent the carriers from moving on the supporting members 57 and 59 in the directions opposite to the normal directions of transferring thus assuring the movement of the carrier by the revolving levers 58 and 60.

In the embodiment described above, the admission and discharge of carriers into and out of the chamber is performed by a single rotor of the sealing means 46 which prevents a direct communication between the inside and outside of the continuous sterilization apparatus so that it is possible to prevent a pressure drop in the chamber 41.

Furthermore, because the rotor 47 is immersed in water by providing the water tank 89 on the outside of the sealing means 46, there is no possibility of admitting air into the chamber 41 when the rotor 47 rotates, so that the temperature distribution in the sterilizing section 42 and the heat transmission to the packages are not affected. Moreover, as the packages are preheated in the water tank, it is possible to improve the quality of food in the packages and to reduce energy consumption. It is advantageous to provide a suitable control device for controlling the temperature of the water in the water tank.

Because the partition wall is provided for the thermal insulator 45 to form an air space between it and the upper surface 100 of the cooling water, it is possible to decrease the amount of heat transmitted from the heating medium to the cooling water because of low heat conductivity of air, and it is possible to decrease or increase the sterilization time by raising or lowering the level 44 of the cooling water.

It is preferable to rotate operating shafts 69 and 70 at different speeds at different portions of one revolution by using an indexing mechanism.

We claim:

1. A continuous sterilization apparatus comprising:
   a casing having a laterally extending portion with a vertical dimension less than that of the remainder of said casing, and the lateral end wall of said extending portion having an opening therein;
   a thermally insulating separating member extending in a generally horizontal direction across said remainder of said casing and dividing said remainder of said casing into a heating section in the upper part of said remainder of said casing and a cooling section in the lower part of said remainder of said casing;
   a heating medium filling said heating section and cooling water substantially filling said cooling section, said separating member having downwardly depending portions defining paths for articles to be sterilized, the lower ends of said depending portions extending downwardly into said cooling water for defining pockets between the surface of said cooling water and the underside of said separating member and said heating section and said cooling section being in contact with each other only in a limited contact region constituted by said paths;
   a partition wall depending from the top of said casing at the junction between said laterally extending portion and said remainder of said casing, the laterally extending portion being filled with cooling water;
   carriers for articles to be sterilized;
   a conveyer in said remainder of said casing and having a plurality of carrier receivers for removably and rotatably receiving said carriers for causing said carriers to be maintained in a horizontal position at all times during conveying by said conveyer, said conveyer extending from a position adjacent said partition wall and along said paths and through said heating and cooling sections and back to said position adjacent said partition wall;
   means for moving said conveyer successively through said heating section and said cooling section;
   a rotary valve in said opening in said lateral end wall of said extending portion of said casing;
   substantially horizontally extending carrier supporting feed members extending across said laterally extending portion of said casing from adjacent said rotary valve to adjacent said conveyer and substantially horizontally extending carrier supporting removal means extending across said laterally extending portion of said casing from adjacent said conveyer to adjacent said rotary valve, rotating levers having the ends movable along said carrier supporting members for moving said carriers along said carrier supporting members, and means for rotating said rotating levers in synchronism with the rotation of said rotary valve.

2. An apparatus as claimed in claim 1 in which said carrier supporting members having means for preventing said carriers from moving along said carrier supporting members unless they are moved by said levers.

3. An apparatus as claimed in claim 1 in which said rotary valve comprises a tubular casing, a rotor rotatable within said casing with a narrow gap between said rotor and said casing, said rotor having a plurality of circumferentially spaced pockets for receiving said carriers and means for pushing the carriers out of said pockets.

4. An apparatus as claimed in claim 1 in which each carrier receiver comprises a semicircular member and each carrier is a rotatable carrier having means for holding a plurality of flat flexible packages.

5. An apparatus as claimed in claim 1 further comprising a preheating water tank on the outside of said laterally extending portion of said casing and into which said opening opens, and a further conveyer in said water tank having a plurality of carrier receivers for removably and rotatably receiving said carriers for causing said carriers to be maintained in a horizontal position at all times during conveying by said further conveyer and for conveying said carriers to and from said rotary valve.

6. An apparatus as claimed in claim 1 further comprising shafts on which said rotating levers are mounted for being rotated, guide means on said shafts for supporting said levers for movement in the radial direction during rotation, and cam means on said casing and engaged by said levers for moving said levers radially during rotation for causing said levers to be moved radially outwardly of said shafts toward said carrier supporting members as said levers are moved along said carrier supporting levers and moved radially inwardly during the remainder of rotation.

7. An apparatus as claimed in claim 6 in which said means for rotating said levers comprise means for rotating said shafts at different speeds during different portions of a single revolution.

* * * * *